US012707231B2

(12) United States Patent
Liu et al.

(10) Patent No.: US 12,707,231 B2
(45) Date of Patent: Aug. 11, 2026

(54) ULTRA-WIDEBAND RANGING METHOD AND DEVICE

(71) Applicant: Google LLC, Mountain View, CA (US)

(72) Inventors: Liping Liu, Buffalo Grove, IL (US); Darren David Krahn, Saratoga, CA (US); Xiangjun Zhao, Santa Clara, CA (US); Ning Zhang, Saratoga, CA (US); Jian Wang, Cupertino, CA (US); Roshan Pius, Milpitas, CA (US)

(73) Assignee: Google LLC, Mountain View, CA (US)

( * ) Notice: Subject to any disclaimer, the term of this patent is extended or adjusted under 35 U.S.C. 154(b) by 270 days.

(21) Appl. No.: 18/294,042

(22) PCT Filed: Aug. 17, 2021

(86) PCT No.: PCT/US2021/046318

§ 371 (c)(1),
(2) Date: Jan. 31, 2024

(87) PCT Pub. No.: WO2023/022708

PCT Pub. Date: Feb. 23, 2023

(65) Prior Publication Data

US 2024/0381053 A1 Nov. 14, 2024

(51) Int. Cl.
*H04W 4/02* (2018.01)
*G01S 13/02* (2006.01)
(Continued)

(52) U.S. Cl.
CPC ......... *H04W 4/023* (2013.01); *G01S 13/0209* (2013.01); *G01S 13/08* (2013.01);
(Continued)

(58) Field of Classification Search
CPC ................................ H04W 4/023; H04W 4/80
See application file for complete search history.

(56) References Cited

U.S. PATENT DOCUMENTS

2004/0264701 A1 12/2004 Lee et al.
2010/0005294 A1 1/2010 Kostiainen et al.
(Continued)

FOREIGN PATENT DOCUMENTS

WO WO 2021/089195 5/2021

OTHER PUBLICATIONS

International Search Report issued in International Application No. PCT/US2021/046318, mailed May 9, 2022, 4 pages.
(Continued)

*Primary Examiner* — Myron Wyche
(74) *Attorney, Agent, or Firm* — McDonnell Boehnen Hulbert & Berghoff LLP

(57) ABSTRACT

An ultra-wideband (UWB) ranging method comprises determining, by a first device, that the first device is within proximity of a second device. Responsive to the determination, the first device negotiates a value to use as a UWB session key for securing UWB communications with the second device. The negotiation occurs via a communication protocol different from a UWB communication protocol. The first device controls a UWB subsystem therein to encrypt information communicated via the UWB subsystem based on the negotiated value of the UWB session key instead of a default value for the UWB session key that is specified in the UWB communication protocol. The information facilitates determining the distance between the first device and the second device.

20 Claims, 7 Drawing Sheets

500

RESPONSIVE TO DETERMINING, BY A FIRST DEVICE, THAT THE FIRST DEVICE IS WITHIN PROXIMITY OF A SECOND DEVICE, NEGOTIATING, BY THE FIRST DEVICE AND WITH THE SECOND DEVICE, A VALUE TO USE AS A UWB SESSION KEY TO SECURE UWB COMMUNICATIONS, WHEREIN THE NEGOTIATING IS PERFORMED VIA A COMMUNICATION PROTOCOL DIFFERENT FROM A UWB COMMUNICATION PROTOCOL

505

CAUSING A UWB SUBSYSTEM OF THE FIRST DEVICE TO ENCRYPT INFORMATION COMMUNICATED VIA THE UWB SUBSYSTEM BASED ON THE NEGOTIATED VALUE OF THE UWB SESSION KEY INSTEAD OF THE DEFAULT VALUE OF UWB SESSION KEY, WHEREIN THE INFORMATION FACILITATES DETERMINING A DISTANCE BETWEEN THE FIRST DEVICE AND THE SECOND DEVICE

(51) Int. Cl.
*G01S 13/08* (2006.01)
*G01S 13/76* (2006.01)
*H04L 9/40* (2022.01)
*H04W 4/80* (2018.01)

(52) U.S. Cl.
CPC ........ *G01S 13/765* (2013.01); *H04L 63/0492* (2013.01); *H04W 4/80* (2018.02)

(56) References Cited

U.S. PATENT DOCUMENTS

| | | | | |
|---|---|---|---|---|
| 2012/0328096 | A1 | 12/2012 | Shah et al. | |
| 2019/0116619 | A1 | 4/2019 | Hauck et al. | |
| 2019/0135229 | A1 | 5/2019 | Ledvina et al. | |
| 2020/0062217 | A1* | 2/2020 | Ledvina | H04W 64/00 |
| 2020/0336303 | A1 | 10/2020 | Sierra et al. | |

OTHER PUBLICATIONS

Written Opinion issued in International Application No. PCT/US2021/046318, mailed May 9, 2022, 6 pages.

* cited by examiner

100

DEVICE 104B

UWB INFORMATION 110

OOB INFORMATION 105

DEVICE 104A

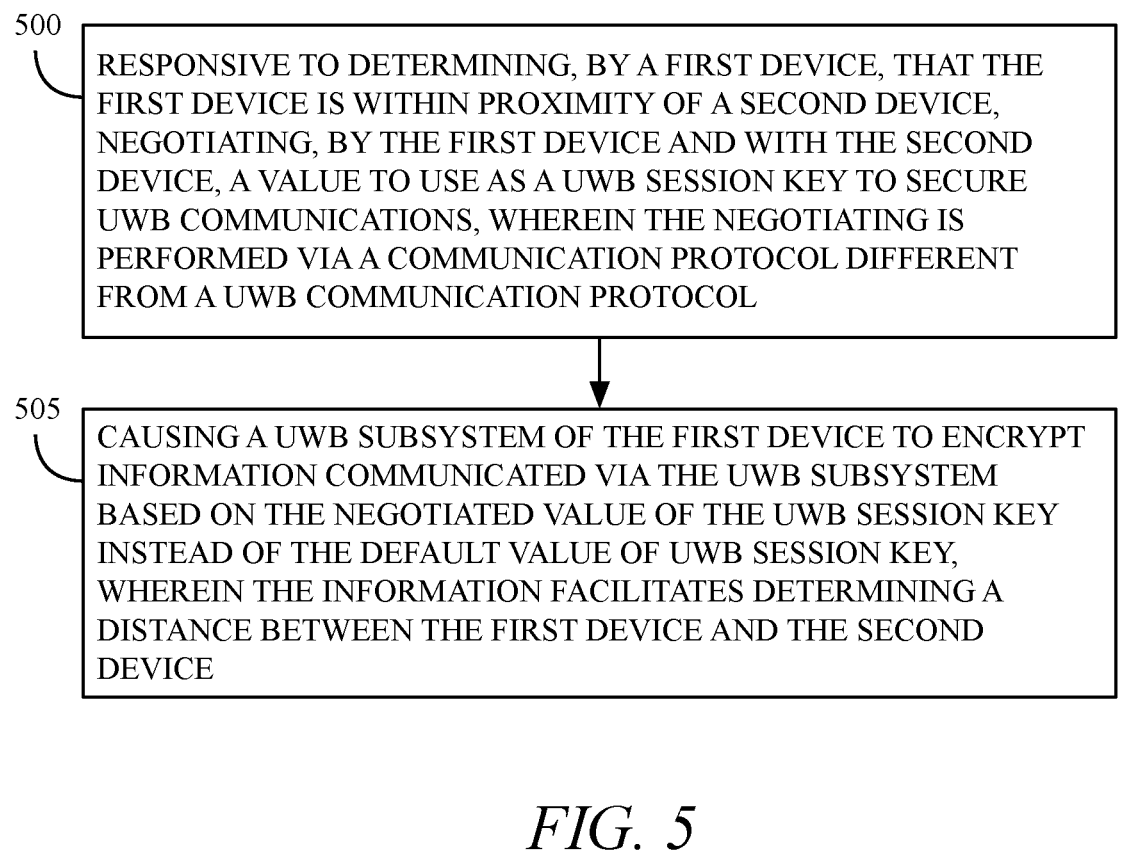

RESPONSIVE TO DETERMINING, BY A FIRST DEVICE, THAT THE FIRST DEVICE IS WITHIN PROXIMITY OF A SECOND DEVICE, NEGOTIATING, BY THE FIRST DEVICE AND WITH THE SECOND DEVICE, A VALUE TO USE AS A UWB SESSION KEY TO SECURE UWB COMMUNICATIONS, WHEREIN THE NEGOTIATING IS PERFORMED VIA A COMMUNICATION PROTOCOL DIFFERENT FROM A UWB COMMUNICATION PROTOCOL

505

CAUSING A UWB SUBSYSTEM OF THE FIRST DEVICE TO ENCRYPT INFORMATION COMMUNICATED VIA THE UWB SUBSYSTEM BASED ON THE NEGOTIATED VALUE OF THE UWB SESSION KEY INSTEAD OF THE DEFAULT VALUE OF UWB SESSION KEY, WHEREIN THE INFORMATION FACILITATES DETERMINING A DISTANCE BETWEEN THE FIRST DEVICE AND THE SECOND DEVICE

*FIG. 5*

ULTRA-WIDEBAND RANGING METHOD AND DEVICE

CROSS-REFERENCE TO RELATED APPLICATION

This application is the U.S. national phase under 35 U.S.C. § 371 of International Application No. PCT/US2021/046318, filed Aug. 17, 2021, the entirety of which is hereby incorporated by reference.

BACKGROUND

Field

This application generally relates to systems that communicate information via ultra-wideband communication techniques. In particular, this application describes examples of ultra-wideband ranging methods and devices.

Description of Related Art

Many devices are equipped with hardware that facilitates determining the device's location. For example, some devices include circuitry that facilitates determining device location based on global positioning satellite (GPS) signals. The location of the device can, in some instances, be uploaded to a server to facilitate location sharing with other devices. However, the accuracy of the location determined via GPS is often lacking. Further, GPS signals have difficulty reaching devices in certain environments (e.g., urban canyons, indoor settings, etc.).

To alleviate some of these shortcomings, some newer devices are equipped with ultra-wideband (UWB) circuitry that facilitates communicating information with other similarly equipped devices. The modulation techniques used by these systems facilitate determining the distance between devices to within centimeters. Further, the power consumed by the UWB circuitry tends to be relatively low. Moreover, communications via UWB circuitry tend to work well in environments where multipath interference is exhibited (e.g., indoor environments).

SUMMARY

In a first aspect, an ultra-wideband (UWB) ranging method comprises, responsive to determining, by a first device, that the first device is within proximity of a second device, negotiating, by the first device and with the second device, a value to use as a UWB session key to secure UWB communications with the second device. The negotiation occurs via a communication protocol different from a UWB communication protocol. The first device controls a UWB subsystem therein to encrypt information communicated via the UWB subsystem based on the negotiated value of the UWB session key instead of a default value to use as the UWB session key that is specified in the UWB communication protocol. The information facilitates determining the distance between the first device and the second device.

In a second aspect, a computing device that facilitates ultra-wideband (UWB) ranging includes a memory and a processor. The memory stores instruction code. The processor is in communication with the memory. The instruction code is executable by the processor to cause the computing device to perform operations that include, responsive to determining, by the computing device, that the computing device is within proximity of a second device, negotiating, by the computing and with a second computing device, a value to use as a UWB session key to secure UWB communications with the second computing device. The negotiation occurs via a communication protocol different from a UWB communication protocol. The computing device controls a UWB subsystem therein to encrypt information communicated via the UWB subsystem based on the negotiated value of the UWB session key instead of a default value to use as the UWB session key that is specified in the UWB communication protocol. The information facilitates determining the distance between the computing device and the second computing device.

In a third aspect, a non-transitory computer-readable medium having stored thereon instruction code that facilitates ultra-wideband (UWB) ranging is provided. When the instruction code is executed by a processor of a computing device, the computing device performs operations that include, responsive to determining that the computing device is within proximity of a second computing device, negotiating, by the first computing device and with the second computing device, a value to use as a UWB session key to secure UWB communications with the second device. The negotiation occurs via a communication protocol different from a UWB communication protocol. The first device controls a UWB subsystem therein to encrypt information communicated via the UWB subsystem based on the negotiated value of the UWB session key instead of a default value to use as the UWB session key that is specified in the UWB communication protocol. The information facilitates determining the distance between the first device and the second device.

In a fourth aspect, a computing device that facilitates ultra-wideband (UWB) ranging is provided. The computing device comprises means for determining that the computing device is within proximity of a second computing device. The computing device comprises means for negotiating a value to use as a UWB session key to secure UWB communications with the second device. The negotiation occurs via a communication protocol different from a UWB communication protocol. The first computing device comprises means for controlling a UWB subsystem therein to encrypt information communicated via the UWB subsystem based on the negotiated value of the UWB session key instead of a default value to use as the UWB session key that is specified in the UWB communication protocol. The information facilitates determining the distance between the first device and the second device.

The foregoing summary is illustrative only and is not intended to be in any way limiting. In addition to the illustrative aspects, embodiments, and features described above, further aspects, embodiments, and features will become apparent by reference to the figures and the following detailed description and the accompanying drawings.

BRIEF DESCRIPTION OF THE FIGURES

FIG. 1 illustrates an environment that includes devices that facilitate the performance of an ultra-wideband (UWB) ranging method, in accordance with example embodiments.

FIG. 5 illustrates a method performed by one or more devices described herein, in accordance with example embodiments.

DETAILED DESCRIPTION

Figure 2:
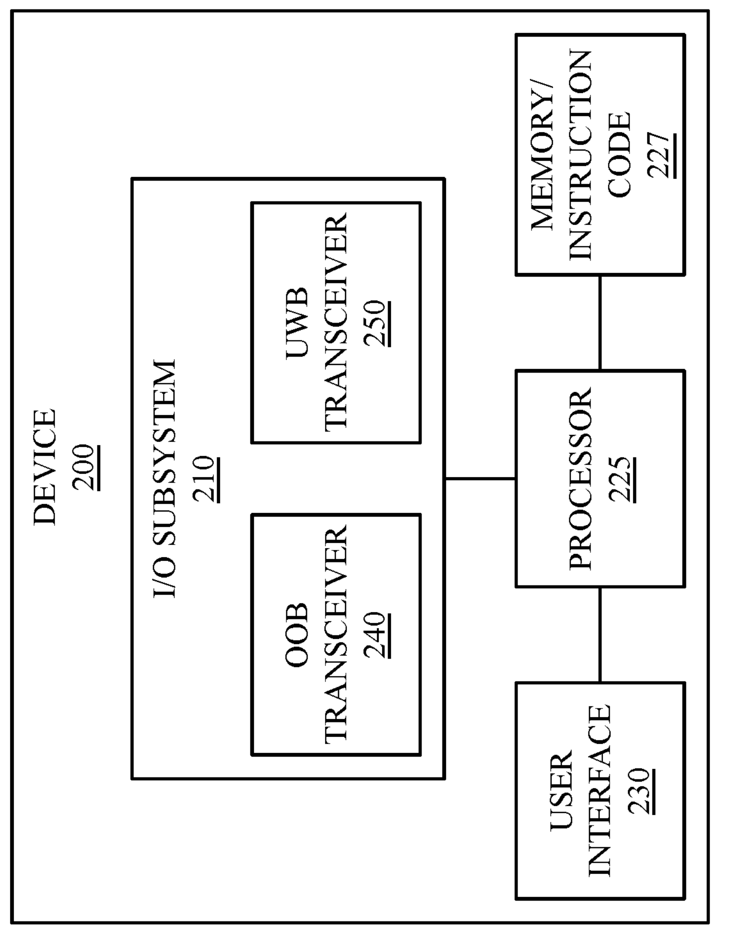
FIG. 2 illustrates a device, in accordance with example embodiments.

Implementations disclosed herein provide technological improvements that are particular to computer technology, such as those related to securing communications, reducing device complexity, and reducing device cost. For example, example devices disclosed herein are configured to negotiate a session key to facilitate encrypting wireless communications. The negotiated session key is more secure than a predefined session key that may be used in other instances. Further, the devices may not require a secure hardware element to generate the session key, thus reducing device complexity and cost.

Various examples of systems, devices, and/or methods are described herein. Words such as "example" and "exemplary" that may be used herein are understood to mean "serving as an example, instance, or illustration." Any embodiment, implementation, and/or feature described herein as being an "example" or "exemplary" is not necessarily to be construed as preferred or advantageous over any other embodiment, implementation, and/or feature unless stated as such. Thus, other embodiments, implementations, and/or features may be utilized, and other changes may be made without departing from the scope of the subject matter presented herein.

Accordingly, the examples described herein are not meant to be limiting. It will be readily understood that the aspects of the present disclosure, as generally described herein, and illustrated in the figures, can be arranged, substituted, combined, separated, and designed in a wide variety of different configurations.

Further, unless the context suggests otherwise, the features illustrated in each of the figures may be used in combination with one another. Thus, the figures should be generally viewed as component aspects of one or more overall embodiments, with the understanding that not all illustrated features are necessary for each embodiment.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

Moreover, terms such as "substantially" or "about" that may be used herein are meant that the recited characteristic, parameter, or value need not be achieved exactly, but that deviations or variations, including, for example, tolerances, measurement error, measurement accuracy limitations and other factors known to those skilled in the art, may occur in amounts that do not preclude the effect the characteristic was intended to provide.

As noted above, some newer devices are equipped with ultra-wideband (UWB) circuitry that facilitates communicating information with other similarly equipped devices. The modulation techniques used therein facilitate determining the distance between devices to within centimeters. Various standards have been proposed to facilitate interoperability between devices.

One such standard is promulgated by the FiRa Consortium. The standard specifies several different packet configurations for communicating information between FiRa compliant devices. Some of the packet configurations include a session timestamp (STS) that can be used by devices to determine the amount of time required for a UWB signal to travel between devices. This, in turn, facilitates determining the range between the devices.

The FiRa standard specifies various encryption techniques to apply to UWB packets to secure UWB communications between the devices. One encryption technique involves encrypting information in the packet based on a predefined/static session key, the value of which is specified in the standard. The obvious problem with this technique is that a malicious device can be configured with the session key and, therefore, can eavesdrop on communications between other devices.

Another technique involves encrypting information in the packet based on a dynamic session key that is derived from a secure element of one of the devices. The secure element corresponds to a dedicated processor that performs cryptographic operations without revealing decrypted information on a computer bus. However, many devices that can otherwise perform UWB communications do not include a secure element, thus precluding this technique for encrypting information.

Examples of devices and methods for addressing these shortcomings are described below. Generally, a first device and a second device are configured to determine when they are within proximity of one another via a communication technique that does not involve UWB communications. These communication techniques are referred to herein as out-of-band (OOB) to signify that they do not use those resources specific to UWB communications used for ranging operations. For instance, example devices may determine that they are in proximity of one another via Global Navigation Satellite System (GNSS) location information and/or via a received signal strength indication (RSSI) associated with, for example, Bluetooth® communications that occur between the devices.

When the devices are in proximity of one another, the first device and the second device negotiate a value to use as a UWB session key for securing UWB communications. The negotiations occur via GOB communications such as Bluetooth® communications.

The first device then controls a UWB system therein to encrypt UWB communications based on the negotiated value of the UWB session key instead of, for example, the default value for the UWB session key specified, for example, in the standard promulgated by FiRa.

Figure 1:
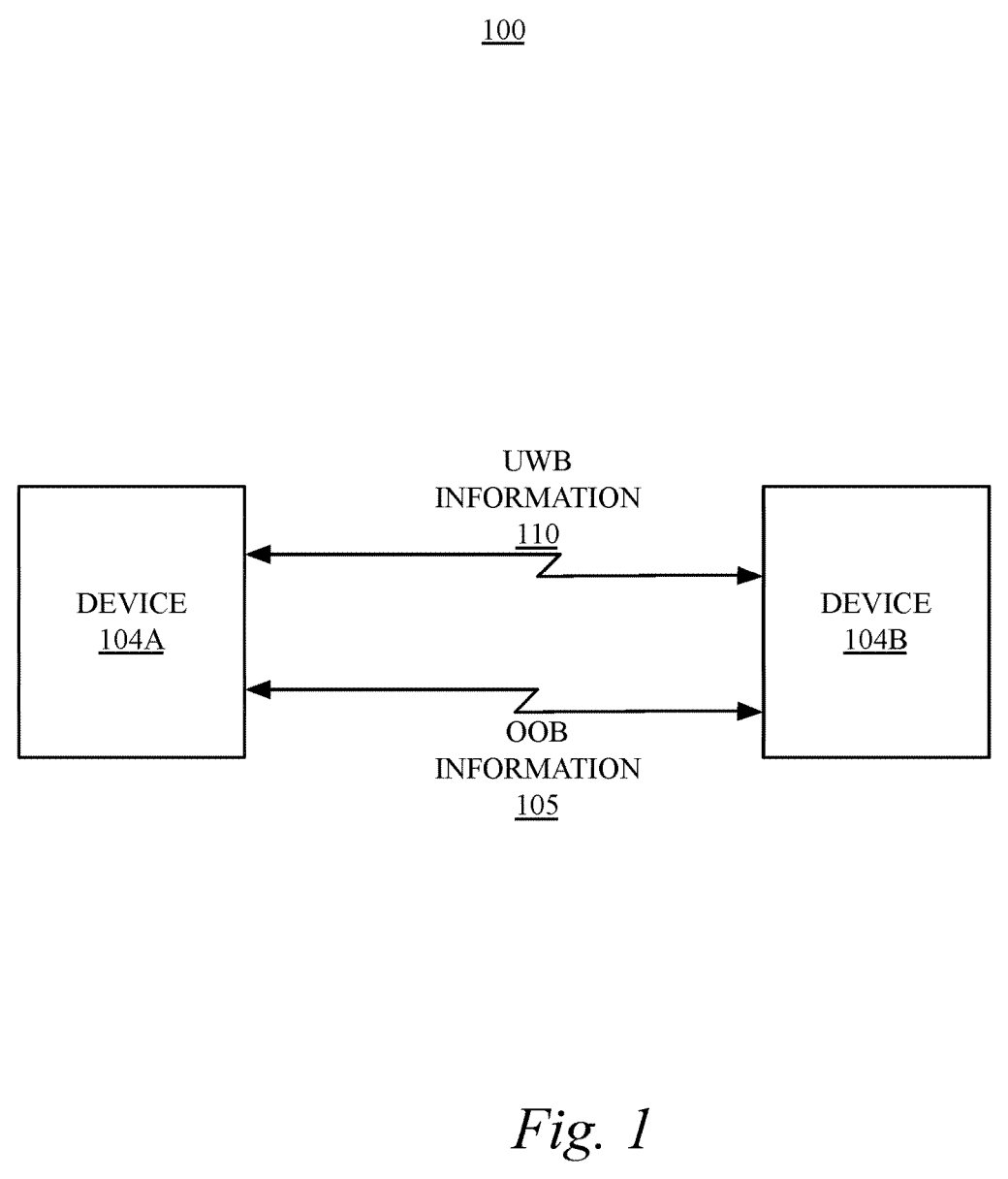

FIG. 1 illustrates an example of an environment 100 that includes various devices 104A, 104B that facilitate the performance of an ultra-wideband (UWB) ranging method. As described in further detail below, the devices 104A, 104B are configured to communicate UWB information 110 and OOB information 105 to one another.

In some examples, the first device 104A and/or the second device 104B are configured to determine whether they are in proximity with one another (e.g., within 50 m). In some examples, when the first device 104A determines that it is within proximity of the second device 104B, the first device 104A is configured to negotiate with the second device 104B a value to use as a UWB session key for securing UWB communications. In some examples, this negotiation is performed using an out-of-band (OOB) communication protocol through which the OOB information 105 is communicated.

As noted above, examples of the UWB communication protocol specify a default value for the session key. However, when a negotiated value for the session key is available, a UWB subsystem of the first device 104A encrypts UWB information 110 based on the negotiated value instead of the default value. In an example, the UWB information 110 facilitates determining the distance between the first device 104A and the second device 104B.

FIG. 2 illustrates an example of a device 200, which could represent device 104A and/or device 104B. An example of the device 200 corresponds to a mobile device, tablet, wearable device, etc. In some examples, the device 200 includes a memory 227, a processor 225, a user interface 230, and an input/output (I/O) subsystem 210.

The processor 225 is in communication with the memory 227. The processor 225 is configured to execute instruction code stored in the memory 227. The instruction code facilitates performing, by the device 200, various operations that are described below. In this regard, the instruction code may cause the processor 225 to control and coordinate various activities performed by the different subsystems of the device 104A, 104B. The processor 225 can correspond to a stand-alone computer system such as an ARM®, Intel®, AMD®, or PowerPC® based computer system or a different computer system and can include application-specific computer systems. The computer system can include an operating system, such as Android™, Windows®, Linux®, Unix®, or a different operating system.

The user interface 230 may include display circuitry. The display circuitry may correspond to a liquid crystal display (LCD), light-emitting diode display (LED) display, etc. The display may include a transparent capacitive touchpad that facilitates receiving user commands. In this regard, the display circuitry may be configured to present a graphical user interface (GUI) that facilitates notifying a user of a first device 104A that the second device 104B is in the proximity of the user (e.g., within 50 m). In another example, when the second device 104B is known to be associated with a particular user (e.g., a user specified in the first user's contact list), the GUI issues an alert such as "User B is 50 meters away." In another example, the GUI depicts a map showing the position of the second user relative to the first user or displays turn-by-turn directions that facilitate finding the second user.

The I/O subsystem 210 may include one or more input/output interfaces configured to facilitate communications with entities outside of the device 200. For instance, the I/O subsystem 210 may include wireless communication circuitry configured to facilitate wireless communications with other devices 104A, 104B. The wireless communication circuitry may include cellular telephone communication circuitry configured to communicate information over a cellular telephone network such as a 3G, 4G, and/or 5G network. Other examples of the wireless communication circuitry facilitate communication of information via an 802.11 based network, Zigbee®, near field communication technology or a different wireless network.

In some examples, the wireless communication circuitry implements an out-of-band (OOB) transceiver 240 that facilitates communicating OOB information 105. In some examples, the OOB transceiver 240 may correspond to a Bluetooth® transceiver that implements a low energy (BLE®) profile. In some examples, the GOB transceiver 240 facilitates proximity detection. For instance, in some examples, the first device 104A communicates a message via, for example, BLE® to the second device 104B. The second device 104B determines a received signal strength indication (RSSI) level associated with the message and communicates the RSSI level back to the first device 104A. The first device 104A uses the RSSI level to determine a rough distance between the first device 104A and the second device 104B (e.g., within 50 m).

In some examples, the wireless communication circuitry implements a UWB transceiver 250 that facilitates communicating UWB information 110. Some examples of the UWB transceiver 250 facilitate low power communications with other similarly equipped devices (i.e., devices that include a similarly configured UWB transceiver). In some examples, the UWB information 110 is communicated in the 3.1 GHz to 10.6 GHz range and occupies a bandwidth of, e.g., between 475 MHz and 525 MHz. In some examples, the frequency and bandwidth conform to UWB transmission requirements promulgated by a regulating authority (e.g., the Federal Communications Commission).

In some examples, information communicated via the UWB transceiver 250 is encoded as a sequence of short pulses (e.g., 2-3 nS). The short pulses facilitate performing ranging operations such as determining the distance between the first device 104A and another similarly equipped device 104B. In an example, the accuracy of the range can be determined within several centimeters.

Figure 3:
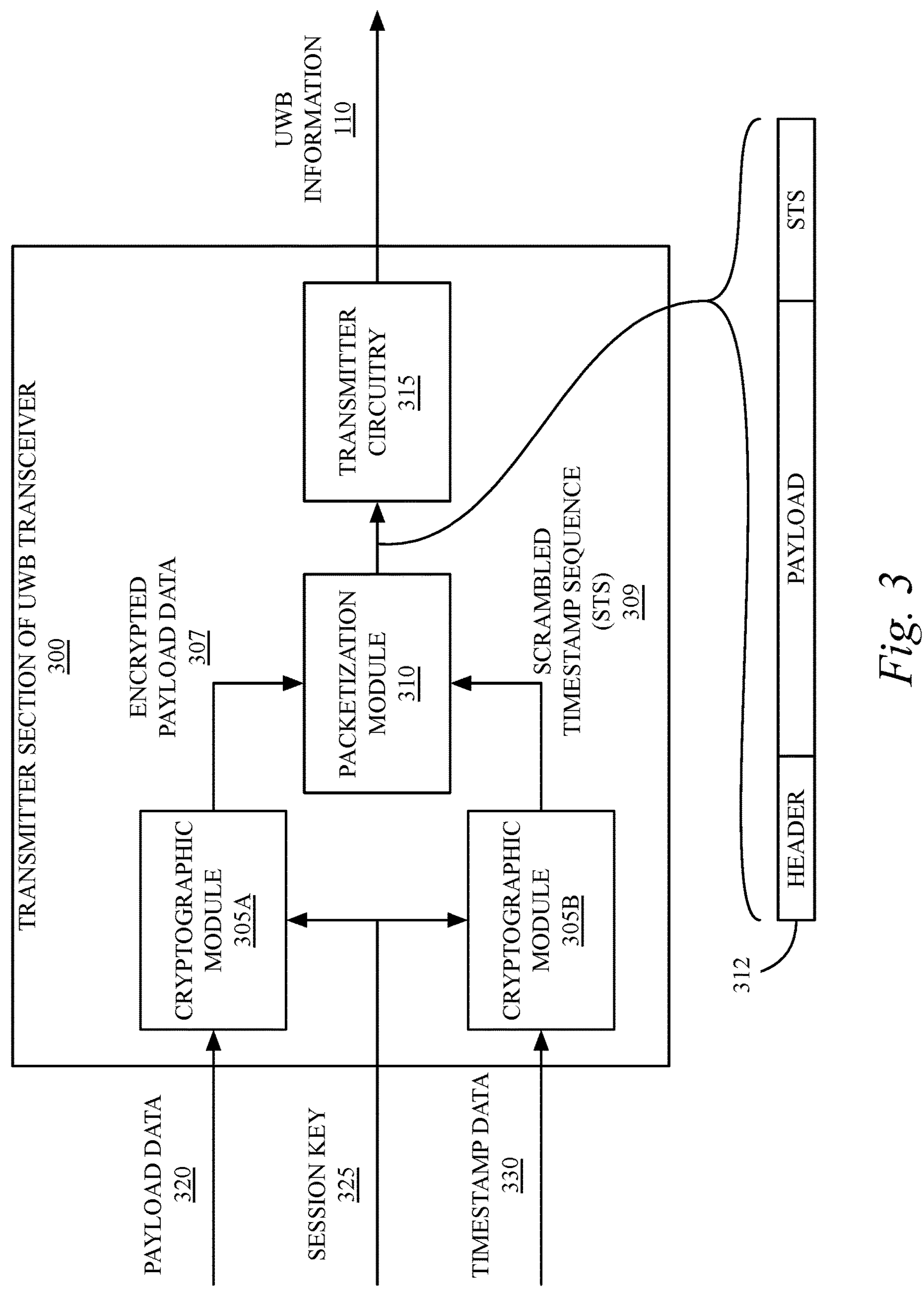
FIG. 3 illustrates a transmitter section of a UWB transceiver of a device, in accordance with example embodiments.

FIG. 3 illustrates an example transmitter section 300 of the UWB transceiver 250. The transmitter section 300 includes a first cryptographic module 305A, a second cryptographic module 305B, a packetization module 310, and transmitter circuitry 315. It should be understood that the transmitter section 300 of the UWB transceiver 250 can include other modules and/or circuitry. The modules and circuitry depicted in the figure are merely illustrative and provided to elucidate various aspects discussed herein.

The first cryptographic module 305A and the second cryptographic module 305B are configured to receive information and to output corresponding encrypted information. For instance, some examples of the first cryptographic module 305A are configured to receive payload data 320 and to output encrypted payload data 307. Some examples of the second cryptographic module 305B are configured to receive timestamp data 330 and to output a scrambled timestamp sequence (STS) 309. As described later, the STS 309 facilitates the performance of ranging operations.

In some examples, the first cryptographic module 305A and the second cryptographic module 305B encrypt information based on a session key 325. In this regard, examples of the cryptographic modules 305A, 305B implement one or more key derivation functions (KDFs) that derive one or more secret keys from the session key 325.

Some examples of the session key 325 correspond to a pseudo-random number. Other examples of the session key 325 correspond to a hash of some other information (e.g., a user name, an email address, passcode etc.). As described herein, in some examples, the value of the session key 325 is negotiated between the first device 104A and the second device 104B. For instance, some examples of the session key 325 correspond to the hash of a passcode that is shared by a user of the first device 104A and a user of the second device 104B.

Some examples of the packetization module 310 receive the encrypted payload data 307 and the STS 309 from the first cryptographic module 305A and the second cryptographic module 305B, respectively. The packetization module 310 outputs a UWB packet 312 (e.g., a stream of ones and zeros) with portions that correspond to the encrypted payload data 307 and the STS 309. It should be understood that the UWB packet 312 depicted in the figure is merely illustrative and provided to elucidate various aspects discussed herein. Other examples of the UWB packet 312 can include other portions, and the portions can be arranged in various orders.

Some examples of the transmitter circuitry 315 are configured to receive the UWB packet 312 from the packetization module 310 and to output the UWB information 110 as an RF modulated signal. Some examples of the transmitter circuitry 315 implement a binary phase-shift keying technique to module the UWB packet 312. In some examples, each one and zero of the packet is encoded as a sequence of short pulses (e.g., two 2-3 nS pulses) of differing phases (e.g., 0 and 180 degrees).

Figure 4A:
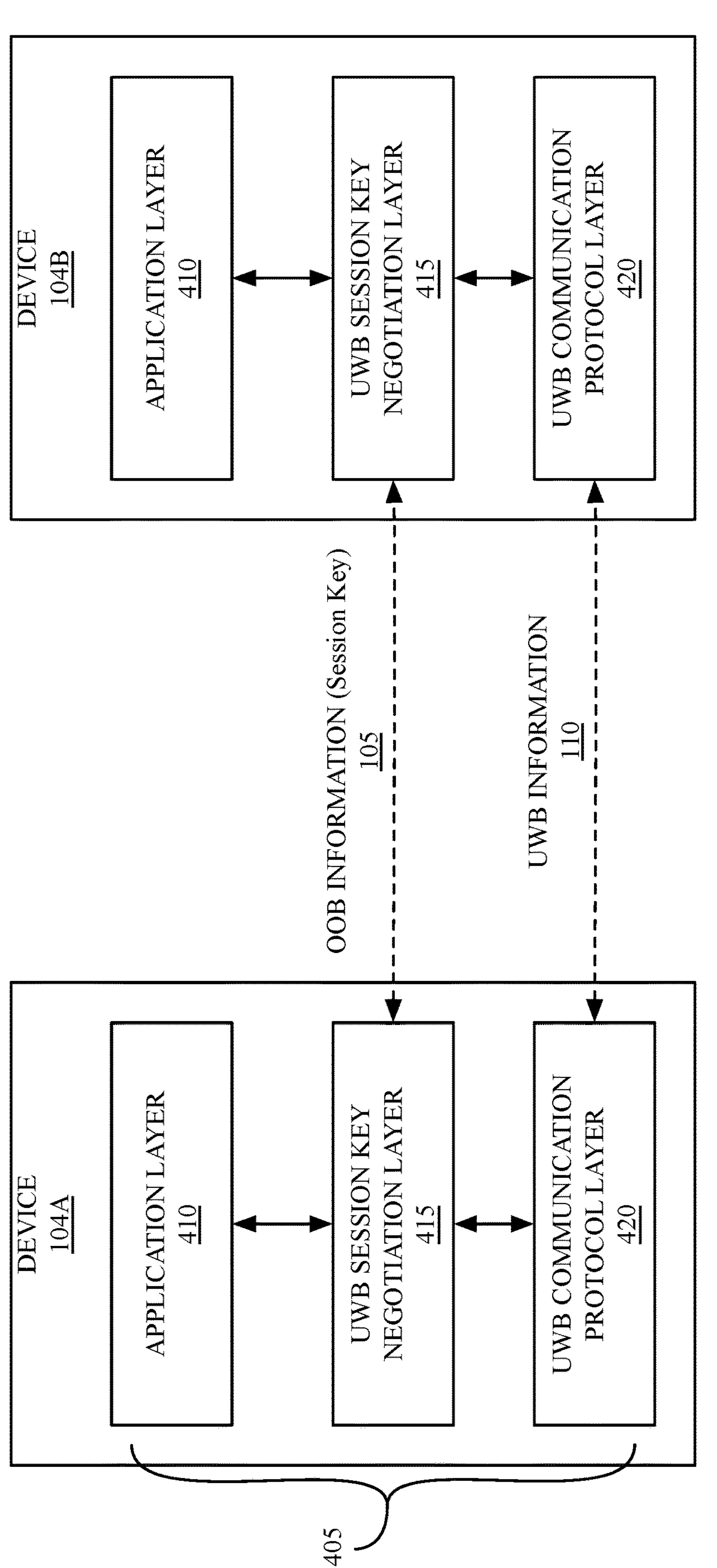
FIG. 4A illustrates a first software stack that operates on one or more of the devices, in accordance with example embodiments.

FIG. 4A illustrates an example of a software stack 405 that may operate on the first device 104A and the second device 104B. The software stack 405 includes an application layer 410, a UWB session key negotiation layer 415, and a UWB communication protocol layer 420.

Some examples of the application layer 410 correspond to a layer of the software stack 405 at which user applications operate. For example, applications that display user interfaces through which users interact operate at the application layer 410. Some examples of applications operating at the application layer 410 of the first device 104A notify a first user that the second device 104B is within proximity of the first user (e.g., within 50 m). The second device 104B may be associated with a particular user specified in the first user's contact list, and the application may issue a prompt, such as "User B is 50 meters away." Other examples of applications depict a map showing the position of the second user relative to the first user. Yet other examples of the applications provide turn-by-turn directions that facilitate finding the second user.

Some examples of the UWB session key negotiation layer 415 correspond to a layer of the software stack 405 at which instruction code that facilitates UWB session key negotiations operates, such as a session key negotiation application. Some examples of the session key negotiation application establish communications with the corresponding session key negotiation application of the second device 104B via an OOB communication protocol (e.g., a communication protocol other than the UWB communication protocol). For instance, some examples of the session key negotiation application facilitate the establishment of a BLE® connection with the second device 104B.

Some examples of the session key negotiation application facilitate proximity detection. For instance, in some examples, the session key negotiation application of the first device 104A communicates a message via, for example, BLE® to the session key negotiation application of the second device 104B. The session key negotiation application of the second device 104B determines a received signal strength indication (RSSI) level associated with the message and communicates the RSSI level back to the session key negotiation application of the first device 104A. The first device 104A uses the RSSI level to determine a rough distance between the first device 104A and the second device 104B. (E.g., within 50 m). When this distance is below a particular threshold, the session key negotiation application determines the first device 104A to be within proximity of the second device 104B.

Some examples of the session key negotiation application determine whether a relationship exists between the first device 104A and the second device 104B. For instance, some examples of the session key negotiation application operating on the first device 104A determine whether the user of the second device 104B is authorized to share a session key 325 with the first device 104A. Some examples of the session key negotiation application operating on the second device 104B perform a similar operation.

In some examples, when session key sharing is determined to be permitted, the session key negotiation application selects or generates a session key 325 and communicates the session key 325 to the UWB communication protocol layer 420. For instance, in some examples, the session key negotiation code selects or derives a session key 325 based on a previously agreed to session key and/or passcode known only by the user of the first device 104A and the user of the second device 104B. In some examples, the previously agreed-upon session key and/or passcode is specified in contact lists stored on the respective devices 104A, 104B. In this regard, a particular user may have several different session keys/passcodes associated with different contacts. In some examples, the same session key/passcode can be associated with multiple contacts (e.g., family members can share the same session key/password).

In some instances, an established communication protocol exists between respective applications operating at the application layers of the first device 104A and second device 104B. In this case, in some examples, the value to use as the UWB session key to secure UWB communications is negotiated via the respective applications operating at the application layers. For instance, one or more of the operations performed by the respective session key negotiation applications can be performed instead by the applications operating at the respective application layers. Otherwise, a communication protocol to negotiate the value is established by respective session key negotiation applications of the first device 104A and the second device 104B.

Some examples of the UWB communication protocol layer 420 correspond to a layer of the software stack 405 at which instruction code that facilitates UWB communications operates. Some examples of the UWB communication application control the UWB transceiver 250 to facilitate UWB communications. Some examples of the UWB communication application implement one or more of the modules of the UWB transceiver 250. For instance, some examples of the UWB communication application perform or assist in the performance of one or more cryptographic algorithms implemented by the first cryptographic module 305A and the second cryptographic module 305B. For instance, some examples of the UWB communication application are configured to receive the session key 325 from the UWB session key negotiation application and apply one or more hashing functions and/or encryption techniques to the session key 325 to derive the STS communicated in the UWB packet 312. In this regard, some examples of the UWB communication application implement AES-128 (Advanced Encryption Standard) logic and use this logic to derive the STS from the session key 325.

In some examples, applications operating at the UWB session key negotiation layer 415 and the UWB communication protocol layer 420 are pre-installed on the first device 104A and the second device 104B, e.g., as part of the operating system. One or more applications operating at the application layer can be installed by respective users of the first device 104A and the second device 104B.

Figure 4B:
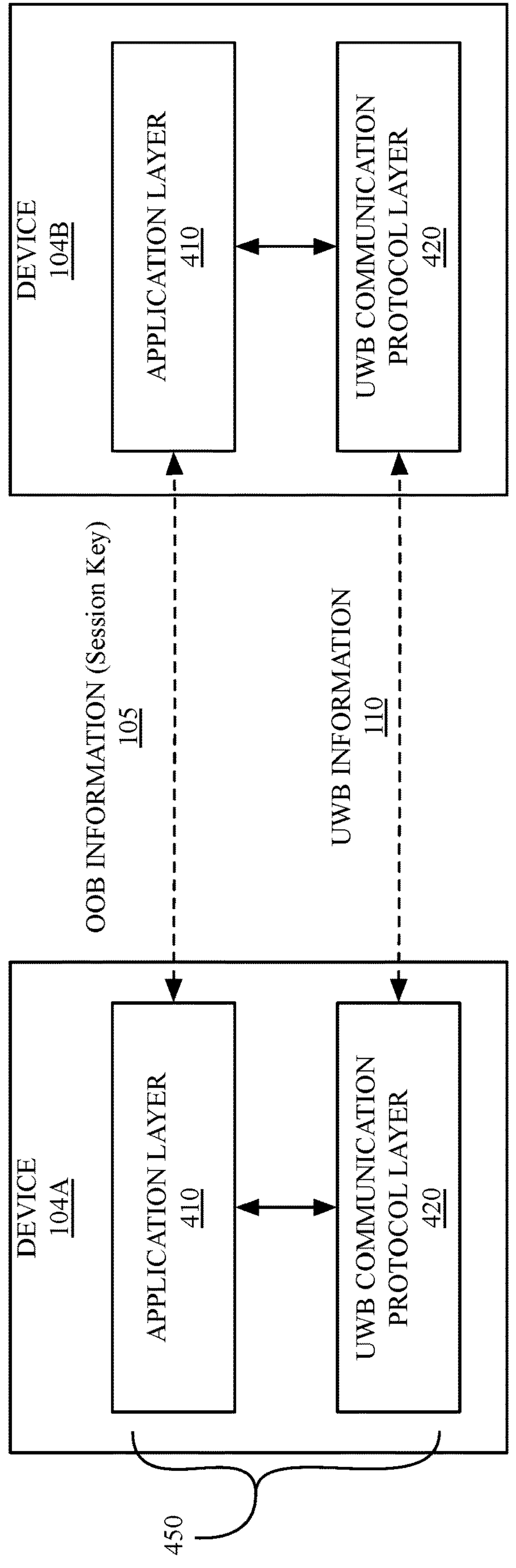
FIG. 4B illustrates a second software stack that operates on one or more of the devices, in accordance with example embodiments.

FIG. 4B illustrates another example of a software stack 450 that may operate on the first device 104A and the second device 104B. The software stack 450 includes an application layer 410 and a UWB communication protocol layer 420.

The software stack 450 of FIG. 4B differs from the software stack 405 of FIG. 4A in that one or more of the operations performed at the UWB session key negotiation layer 415 are moved to the application layer 410. In this regard, some examples of applications operating at the application layer 410 of the first device 104A may perform the operations described above. Thus, in cases where the operating system of a particular device 104A does not implement a software stack that includes, for example, a UWB session key negotiation layer 415, a user of the device 104A can install an application that performs this functionality. Further, in some examples, this application can communicate with either a corresponding application of the second device 104B, or when available, with a session key negotiation application operating at the UWB session key negotiation layer 415 of the second device 104B.

Some examples of the application may issue a prompt, such as "User B is 50 meters away. Would you like to determine User B's precise location?" In some examples, an affirmative response to the prompt may control the application to perform the operations described above that are performed by the session key negotiation application. For instance, in some examples, if a predefined session key 325 has been established with the user of the second device 104B, the application communicates the session key 325 to the UWB communication application. If a predefined session key 325 has not been established, the application on the first device 104A and the application on the second device 104B may issue a series of prompts to the respective users to facilitate the establishment of the session key 325. For example, the user of the first device 104A may be prompted to specify a passcode. The user of the second device 104B may, in turn, be prompted to accept the passcode, reject the passcode, or suggest a different passcode. Acceptance of the passcode may cause the applications on the respective devices 104A, 104B to establish a session key 325 based on the passcode (e.g., by using a particular hashing function on the passcode). The agreed-to session key 325 is then communicated to the UWB communication application to facilitate ranging information, whereby the UWB information 110 is encrypted according to the agreed to passcode/session key 325.

FIG. 5 illustrates an example of a method performed by one or more devices described herein. Block 500 involves, responsive to determining, by a first device 104A, that the first device 104A is within proximity of a second device 104B, negotiating, by the first device 104A and with the second device 104B, a value to use as a UWB session key 325 to secure UWB communications. The negotiating is performed via a communication protocol different from a UWB communication protocol.

Block 505 involves causing a UWB subsystem of the first device 104A to encrypt information communicated via the UWB subsystem based on the negotiated value of the UWB session key 325 instead of a default value for the UWB session key that is specified in the UWB communication protocol. The information facilitates determining a distance between the first device 104A and the second device 104B.

In some examples of the method, determining that the first device 104A is within proximity of the second device 104B involves determining that the first device 104A is within proximity of the second device 104B via a communication protocol different from the UWB communication protocol.

In some examples of the method, the communication protocol is one of: a Bluetooth® protocol, or an 802.11 based protocol.

In some examples of the method, the first device 104A implements a software stack 405 comprising an application layer 410 at which user applications operate, a UWB session key negotiation layer 415 at which instruction code that facilitates UWB session key negotiations operates, and a UWB communication protocol layer 420 at which instruction code that facilitates UWB communications operates. In these examples, negotiating the value to use as a UWB session key to secure UWB communications further involves, when an established communication protocol exists between an application operating at the application layer of the first device and an application operating at the application layer of the second device, negotiating the value to use as the UWB session key to secure UWB communications via the established communication protocol; and when an established communication protocol does not exist, establishing a communication protocol to negotiate the value via an application operating at the UWB session key negotiation layer. Examples of this method further involve communicating, via the instruction code that operates at the UWB session key negotiation layer 415, the negotiated UWB session key 325 to the instruction code that operates at the UWB communication protocol layer 420.

In some examples of the method, the first device 104A implements a software stack 450 comprising an application layer 410 at which user applications operate, and a UWB communication protocol layer 420 at which instruction code that facilitates wideband communications operates. Examples of these methods, negotiating the value to use as the UWB session key 325 involves negotiating, by a user application operating at the application layer 410, the value to use as the UWB session key 325.

In some examples of the method, the UWB communication protocol defines one or more packet configuration messages that comprise a scrambled timestamp sequence (STS) that facilitates determining the distance between the first device 104A and the second device 104B. In these examples, encrypting information communicated by the first device 104A involves encrypting the STS of the one or more packet configuration messages communicated by the first device 104A to the second device 104B based on the negotiated UWB session key 325.

In some examples of the method, prior to negotiating the value to use as the UWB session key 325, the method involves requesting, by the first device 104A, user permission to negotiate the value to use as the UWB session key 325 for securing UWB communications. The method further involves, responsive to receiving user permission, negotiating the value of the UWB session key 325.

In some examples of the method, prior to negotiating the value to use as the UWB session key 325, the method involves determining whether a previously established value to use as the UWB session key 325 is stored in the first device 104A. If a previously established value to use as the UWB session key 325 is stored, the method further involves using the previously established value as the value to use as the UWB session key 325.

In some examples of the method, when the first device and the second device are unable to negotiate a value to use as a UWB session key to secure UWB communications, the default value to use as the UWB session key that is specified in the UWB communication protocol is utilized to secure UWB communications.

Figure 6:
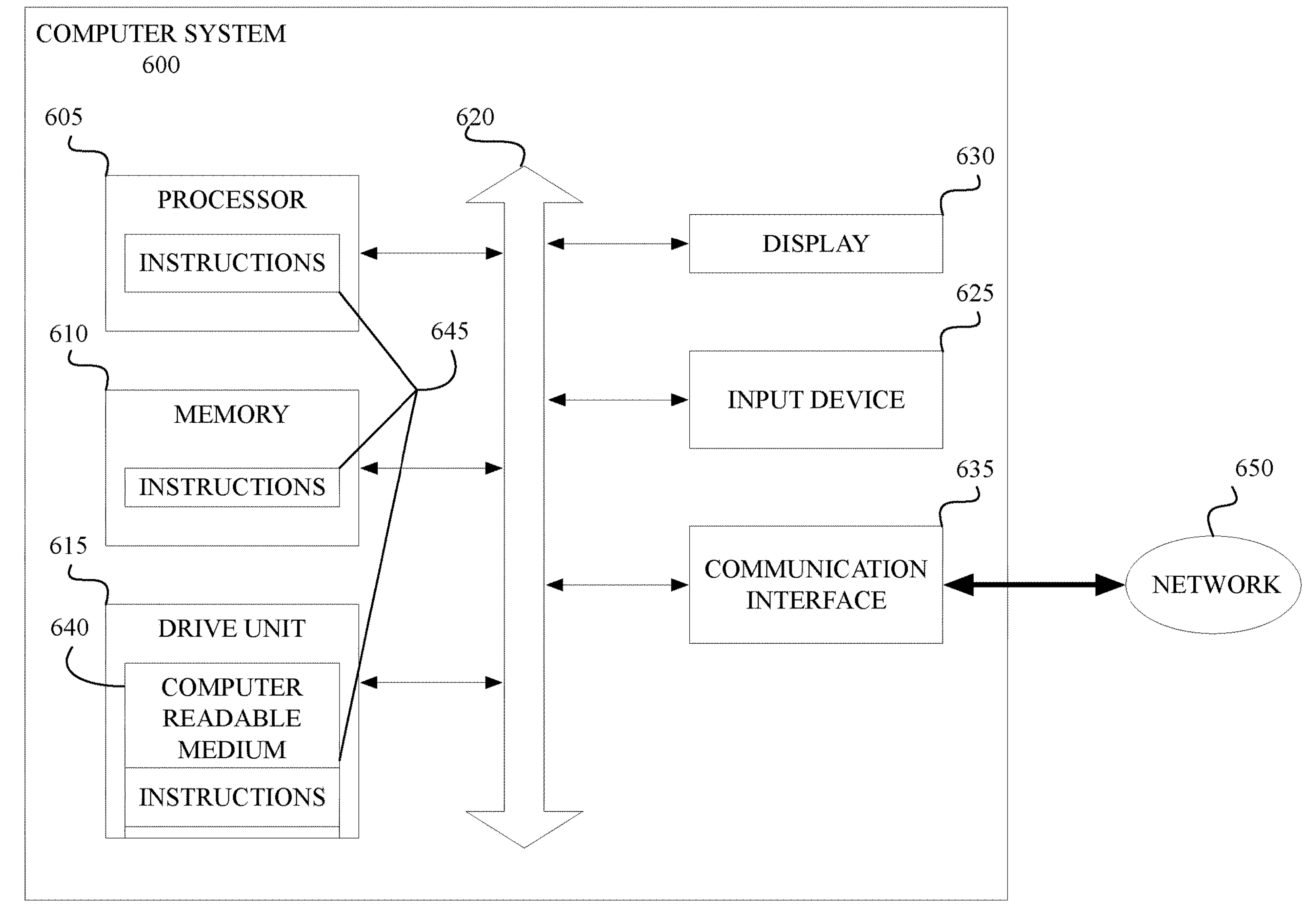
FIG. 6 illustrates a computer system, in accordance with example embodiments.

FIG. 6 illustrates an example of a computer system 600 that can form part of or implement any of the systems and/or devices described above. The computer system 600 can include a set of instructions 645 that the processor 605 can execute to cause the computer system 600 to perform any of the operations described above. An example of the computer system 600 can operate as a stand-alone device or can be connected, e.g., using a network, to other computer systems or peripheral devices.

In a networked example, the computer system 600 can operate in the capacity of a server or as a client computer in a server-client network environment, or as a peer computer system in a peer-to-peer (or distributed) environment. The computer system 600 can also be implemented as or incorporated into various devices, such as a personal computer or a mobile device, capable of executing instructions 645 (sequential or otherwise), causing a device to perform one or more actions. Further, each of the systems described can include a collection of subsystems that individually or jointly execute a set, or multiple sets, of instructions to perform one or more computer operations.

The computer system 600 can include one or more memory devices 610 communicatively coupled to a bus 620 for communicating information. In addition, code operable to cause the computer system to perform operations described above can be stored in the memory 610. The memory 610 can be random-access memory, read-only memory, programmable memory, hard disk drive, or any other type of memory or storage device.

The computer system 600 can include a display 630, such as a liquid crystal display (LCD), a cathode ray tube (CRT), or any other display suitable for conveying information. The display 630 can act as an interface for the user to see processing results produced by processor 605.

Additionally, the computer system 600 can include an input device 625, such as a keyboard or mouse or touch-screen, configured to allow a user to interact with components of system 600.

The computer system 600 can also include a disk or optical drive unit 615. The drive unit 615 can include a computer-readable medium 640 in which the instructions 645 can be stored. The instructions 645 can reside completely, or at least partially, within the memory 610 and/or within the processor 605 during execution by the computer system 600. The memory 610 and the processor 605 also can include computer-readable media, as discussed above.

The computer system 600 can include a communication interface 635 to support communications via a network 650. The network 650 can include wired networks, wireless networks, or combinations thereof. The communication interface 635 can enable communications via any number of wireless broadband communication standards, such as the Institute of Electrical and Electronics Engineering (IEEE) standards 802.11, 802.12, 802.16 (WiMAX), 802.20, cellular telephone standards, or other communication standards.

Accordingly, methods and systems described herein can be realized in hardware, software, or a combination of hardware and software. The methods and systems can be realized in a centralized fashion in at least one computer system or in a distributed fashion where different elements are spread across interconnected computer systems. Any kind of computer system or other apparatus adapted for carrying out the methods described herein can be employed.

The methods and systems described herein can also be embedded in a computer program product, which includes all the features enabling the implementation of the operations described herein and which, when loaded in a computer system, can carry out these operations. Computer program as used herein refers to an expression, in a machine-executable language, code or notation, of a set of machine-executable instructions intended to cause a device to perform a particular function, either directly or after one or more of a) conversion of a first language, code, or notation to another language, code, or notation; and b) reproduction of a first language, code, or notation.

While the systems and methods of operation have been described with reference to certain examples, it will be understood by those skilled in the art that various changes can be made and equivalents can be substituted without departing from the scope of the claims. Therefore, it is intended that the present methods and systems not be limited to the particular examples disclosed, but that the disclosed methods and systems include all embodiments falling within the scope of the appended claims.

The invention claimed is:

1. An ultra-wideband (UWB) ranging method, the method comprising:

responsive to determining, by a first device of a first user, that the first device is within proximity of a second device of a second user, negotiating, by the first device and with the second device, a value to use as a UWB session key to secure UWB communications, wherein the negotiating is performed via a communication protocol different from a UWB communication protocol; and causing a UWB subsystem of the first device to encrypt information communicated via the UWB subsystem based on the negotiated value of the UWB session key instead of a default value for the UWB session key that is specified in the UWB communication protocol, wherein the information facilitates determining a distance between the first device of the first user and the second device of the second user;

wherein the first device implements a software stack comprising an application layer at which user applications operate, and a UWB communication protocol layer at which instruction code that facilitates UWB communications operates, wherein negotiating the value to use as the UWB session key to secure UWB communications comprises negotiating, at the application layer, the value of the UWB session key.

2. The UWB ranging method of claim 1, further comprising:

determining that the first device is within proximity of the second device via a communication protocol different from the UWB communication protocol.

3. The UWB ranging method of claim 1, wherein the communication protocol is one of a Bluetooth® protocol or an 802.11-based protocol.

4. The UWB ranging method of claim 1, wherein the first device implements a UWB session key negotiation layer, and wherein the first device is configured to:

(i) negotiate the value of the UWB session key at the application layer if an established communication protocol exists between a user application operating at the application layer of the first device and an application operating at an application layer of the second device, and (ii) if an established communication protocol does not exist, establish a communication protocol to negotiate the value via an application operating at the UWB session key negotiation layer, and wherein negotiating the value of the UWB session key at the application layer comprises the negotiating of the UWB session key by the user application operating at the application layer of the first device.

5. The UWB ranging method of claim 4, wherein the method further comprises:

communicating, via the instruction code that operates at the UWB session key negotiation layer, the negotiated value of the UWB session key to the instruction code that operates at the UWB communication protocol layer.

6. The UWB ranging method of claim 1, wherein the second device implements a UWB session key negotiation layer at which instruction code that facilitates UWB session key negotiations operates, wherein negotiating the value to use as the UWB session key to secure UWB communications comprises:

if an established communication protocol exists between a user application operating at the application layer of the first device and an application operating at an application layer of the second device, then negotiating, via the established communication protocol, the value to use as the UWB session key to secure UWB communications;

wherein, if an established communication protocol does not exist, then a communication protocol is established to negotiate the value via an application operating at the UWB session key negotiation layer of the second device.

7. The UWB ranging method of claim 6, wherein the method further comprises:

communicating, via the instruction code that operates at the application layer, the negotiated value of the UWB session key to the instruction code that operates at the UWB communication protocol layer.

8. The UWB ranging method of claim 1, wherein a user application operating at the application layer of the first device has functionality of the UWB session negotiation layer functionality for implementing instruction code that facilitates UWB session key negotiations, and an application operating at an application layer of the second device has functionality of the UWB session negotiation layer functionality for implementing instruction code that facilitates UWB session key negotiations.

9. The UWB ranging method of claim 8, wherein the method further comprises:

communicating, via the instruction code that operates at the application layer, the negotiated value of the UWB session key to the instruction code that operates at the UWB communication protocol layer.

10. The UWB ranging method of claim 1, wherein the UWB communication protocol defines one or more packet configuration messages that comprise a scrambled timestamp sequence, STS, that facilitates determining the distance between the first device and the second device, wherein encrypting information communicated via the UWB subsystem comprises:

encrypting the STS of the one or more packet configuration messages communicated by the first device to the second device based on the negotiated UWB session key.

11. The UWB ranging method of claim 1, the method further comprising:

prior to negotiating the value to use as the UWB session key to secure UWB communications, requesting, by the first device, user permission to negotiate the value to use as the UWB session key to secure UWB communications; and wherein responsive to receiving user permission, performing said negotiating of the value to use as the UWB session key to secure UWB communications.

12. The UWB ranging method of claim 1, the method further comprising:

determining whether a relationship exists between the first device and the second device; and in response to determining that a relationship exists between the first device and the second device, retrieving a previously agreed session key or passcode known only to the first user of the first device and the second user of the second device for the session key negotiation.

13. The UWB ranging method of claim 1, wherein prior to negotiating the value to use as the UWB session key to secure UWB communications, the method comprises:

if a previously established value for the UWB session key to secure UWB communications is stored in the first device, using the previously established value as the value to use as the UWB session key to secure UWB communications.

14. A first computing device that facilitates ultra-wideband (UWB) ranging, wherein the first computing device comprises:

one or more processors; and a memory in communication with the one or more processors, wherein the memory stores instruction code that, when executed by the one or more processors, causes the first computing device to perform operations including:

responsive to determining that the first computing device is within proximity of a second computing device, negotiating, by the first computing device and with the second computing device, a value to use as a UWB session key to secure UWB communications, wherein the negotiating is performed via a communication protocol different from a UWB communication protocol, and causing a UWB subsystem of the first computing device to encrypt information communicated via the UWB subsystem based on the negotiated value of the UWB session key instead of a default value for the UWB session key that is specified in the UWB communication protocol, wherein the information facilitates determining a distance between the first computing device of the first user and the second computing device of the second user, wherein the first computing device implements a software stack comprising an application layer at which user applications operate, and a UWB communication protocol layer at which instruction code that facilitates UWB communications operates, wherein negotiating the value to use as the UWB session key to secure UWB communications comprises negotiating, at the application layer, the value of the UWB session key.

15. The first computing device of claim 14, wherein the first computing device implements a UWB session key negotiation layer, and wherein the first computing device is configured to:

(i) negotiate the value of the UWB session key at the application layer if an established communication protocol exists between a user application operating at the application layer of the first computing device and an application operating at an application layer of the second computing device, and (ii) if an established communication protocol does not exist, establish a communication protocol to negotiate the value via an application operating at the UWB session key negotiation layer, and wherein negotiating the value of the UWB session key at the application layer comprises the negotiating of the UWB session key by the user application operating at the application layer.

16. The first computing device of claim 14, wherein a user application operating at the application layer of the first computing device has functionality of the UWB session negotiation layer functionality for implementing instruction code that facilitates UWB session key negotiations, and an application operating at an application layer of the second device has functionality of the UWB session negotiation layer functionality for implementing instruction code that facilitates UWB session key negotiations.

17. The first computing device of claim 14, wherein the UWB communication protocol defines one or more packet configuration messages that comprise a scrambled timestamp sequence, STS, that facilitates determining the distance between the first device and the second device, wherein encrypting information communicated via the UWB subsystem comprises:

encrypting the STS of the one or more packet configuration messages communicated by the first device to the second device based on the negotiated UWB session key.

18. A computer-readable medium having stored thereon instruction code that facilitates ultra-wideband (UWB) ranging, wherein when executed by one or more processors of a first computing device, the instruction code causes the first computing device to perform operations comprising:

responsive to determining that the first computing device is within proximity of a second computing device, negotiating, by the first computing device and with the second computing device, a value to use as a UWB session key to secure UWB communications, wherein the negotiating is performed via a communication protocol different from a UWB communication protocol; and causing a UWB subsystem of the first computing device to encrypt information communicated via the UWB subsystem based on the negotiated value of the UWB session key instead of a default value for the UWB session key that is specified in the UWB communication protocol, wherein the information facilitates determining a distance between the first computing device of the first user and the second computing device of the second user, wherein the first computing device implements a software stack comprising an application layer at which user applications operate, and a UWB communication protocol layer at which instruction code that facilitates UWB communications operates, wherein negotiating the value to use as the UWB session key to secure UWB communications comprises negotiating, at the application layer, the value of the UWB session key.

19. The computer-readable medium of claim 18, wherein the first computing device implements a UWB session key negotiation layer, and wherein the first computing device is configured to:

(i) negotiate the value of the UWB session key at the application layer if an established communication protocol exists between a user application operating at the application layer of the first computing device and an application operating at an application layer of the second computing device, and (ii) if an established communication protocol does not exist, establish a communication protocol to negotiate the value via an application operating at the UWB session key negotiation layer, and wherein negotiating the value of the UWB session key at the application layer comprises the negotiating of the UWB session key by the user application operating at the application layer.

20. The computer-readable medium of claim 18, wherein a user application operating at the application layer of the first computing device has functionality of the UWB session negotiation layer functionality for implementing instruction code that facilitates UWB session key negotiations, and an application operating at an application layer of the second device has functionality of the UWB session negotiation layer functionality for implementing instruction code that facilitates UWB session key negotiations.

* * * * *